No. 663,483.  
L. F. BETTS.  
BROILER.  
(Application filed Apr. 20, 1900.)  
Patented Dec. 11, 1900.
(No Model.)
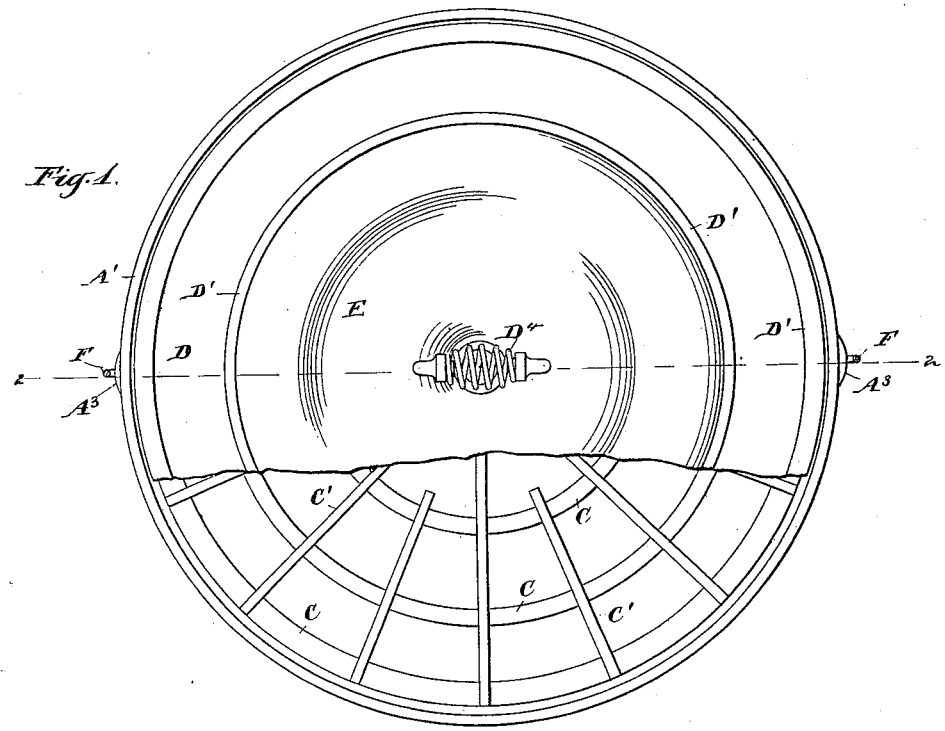
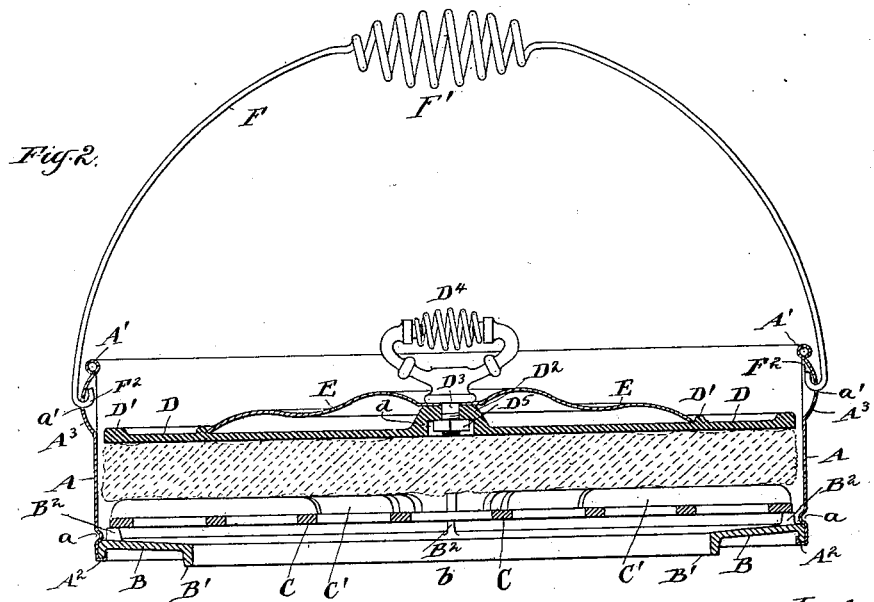
Witnesses:  
M. E. Grace  
J. F. Rizzolo
Inventor:  
Lewis F. Betts,  
by his attorney  
Charles R. Searle
THE NORRIS PETERS CO., PHOTO-LITHO., WASHINGTON, D. C.

UNITED STATES PATENT OFFICE.

LEWIS F. BETTS, OF NEW YORK, N. Y.

BROILER.

SPECIFICATION forming part of Letters Patent No. 663,483, dated December 11, 1900.

Application filed April 20, 1900. Serial No. 13,581. (No model.)

*To all whom it may concern:*

Be it known that I, LEWIS F. BETTS, a citizen of the United States, residing in the city of New York, borough of Brooklyn, in the county of Kings and State of New York, have invented a certain new and useful Improvement in Broilers, of which the following is a specification.

The invention relates to that class of culinary utensils in which steaks, chops, &c., are cooked by direct exposure to the fire.

The object of the invention is to provide a utensil by which the broiling may be quickly and perfectly performed and the smoke and other disagreeable features of the operation avoided.

The invention consists of a pan having an opening in the bottom matching to the opening in the stove or range above the fire, having a follower matching to the interior of the pan and adapted to lie upon the material to be broiled. The broiler is placed in position over the fire with the follower upon the grate and heated. The hot follower is then temporarily removed while the material is laid upon the grate and is then replaced upon the material. The under face of the material is thus exposed directly to the fire, while the upper face is acted upon by the heat given off by the follower. As the latter nearly fills the interior of the pan, the downward draft through the remaining small openings carries the smoke and odors from the cooking into the fire and prevents their escape to the apartment.

In the most complete form of the invention the upper face of the follower is insulated to prevent radiation from that surface, preferably by applying an ornamental plate separated from the follower and forming therewith a closed air-space.

The invention also consists in certain details of construction to be hereinafter described.

The accompanying drawings form a part of this specification and show the invention as I have carried it out.

Figure 1 is a plan view of the broiler, certain portions being broken away to show the parts beneath; and Fig. 2 is a corresponding cross-section, partly in elevation, the plane of section being indicated by the line 2 2 in Fig. 1.

Similar letters of reference indicate the same parts in both figures.

A is the body of the cylindrical pan, preferably of sheet metal, as tin, having the upper edge wired, as at A', and formed with an internal bead $a$ near the lower edge, serving as a shoulder for the bottom B, of cast-iron, held in place by turning under the lower edge $A^2$ of the body. The bottom has a large central opening $b$ and is flanged at B' to match to the opening in a stove. (Not shown.) Upon the upper face of the bottom are four or other number of vertical lugs $B^2$, supporting the open-work spider-frame or grate C, shown as consisting of a series of concentric rings connected by the raised radial arms or fins C', the whole being a removable casting, serving to support the steak or other article to be broiled.

D is the follower, preferably a disk or plate of cast-iron of sufficient thickness to serve in storing and slowly delivering heat. It is formed with the annular beads D', serving the usual function of preventing distortion in manufacture, and has an elevated central boss $D^2$, receiving the screw-threaded shank $D^3$ of the handle $D^4$, held in place by a nut $D^5$, received in the cavity $d$ within the boss on the plane under face of the follower. A plate E, of sheet metal, corrugated annularly or otherwise dished and ornamented, covers a portion of the upper face of the follower and is held upon the boss $D^2$ by the shank $D^3$ passing through a central hole in the plate, and the periphery lies in contact with the upper face of the follower within one of the beads D'.

F is a wire bail having the handle F', by which the broiler may be lifted and carried. The ends $F^2$ are hooked and engage in holes $a'$, formed in the outward swells $A^3$ in the body near the upper edge. The swells allow space for the attachment without encroaching on the interior and interfering with the removal of the follower and grate.

The broiler being placed over the fire with the follower in place, the latter will usually absorb sufficient heat during the time consumed in preparing the material. It is then removed and the material laid upon the grate and the follower replaced, as before described, holding the material firmly against the grate, and by its approximate fit preventing the escape of odors and lessening the evaporation of the juices. The material may be removed and turned, if desired; but if the follower be well heated at the beginning of the operation such will not be generally necessary.

It will be observed that the annular bottom B inclines from all directions toward the central opening, so that any melted fat from the material is led to the fire and consumed, aiding to flavor the material and hasten the cooking operation.

The plate E provides a finish for the upper face of the follower and prevents radiation from that surface.

Meats and other articles of food are quickly and uniformly cooked in the improved broiler and by reason of the retention of the juices are more palatable and digestible than when broiled in the ordinary manner.

Modifications may be made in the forms and proportions without departing from the principle of the invention or sacrificing its advantages.

The general shape of the broiler may be elliptical instead of circular, as shown, and the mass of metal in the follower may be greater or less than here represented.

The ornamental plate E may be varied or omitted or the follower insulated by other means. The grate C may be fixed instead of removable, as shown. I prefer the latter construction on the score of cleanliness.

I claim—

1. The broiler described consisting of an inclosing pan having an open bottom, and a grate above such opening serving to support the material to be broiled, in combination with a follower adapted to absorb and deliver heat and lie upon the material, all substantially as herein specified.

2. In a broiler, an inclosing pan having an open bottom, a grate therein, and a follower matching the interior of said pan and adapted to perform the double function of absorbing heat and delivering it to the material to be broiled and also preventing the escape of odors and smoke from the cooking operation, all combined and arranged to serve substantially as herein specified.

3. In a broiler, an inclosing pan having an open bottom, a grate therein, and a follower adapted to absorb heat and deliver it to the material to be cooked, in combination with each other and with means for insulating the upper face of said follower to prevent the escape of heat by radiation from such face, all substantially as herein specified.

4. The broiler described consisting of the pan or body A, the bottom B therein having the opening b, the removable grate C supported on said bottom, and the follower D adapted to lie upon said grate or on the material supported thereby, all combined and arranged to serve substantially as and for the purposes herein set forth.

5. The pan or body A, the bottom B therein having the opening b, the removable grate C supported on said bottom, and the follower D adapted to lie upon said grate or upon the material supported thereby, in combination with each other and with the plate E forming an insulating air-space on the upper face of said follower and also providing a finish for the latter, all substantially as herein specified.

In testimony that I claim the invention above set forth I affix my signature in presence of two witnesses.

LEWIS F. BETTS.

Witnesses:
ROBT. CONNOR,
CHARLES R. SEARLE.